(12) United States Patent
Vakrat

(10) Patent No.: US 7,165,191 B1
(45) Date of Patent: Jan. 16, 2007

(54) AUTOMATED VERIFICATION OF USER INTERFACE TESTS ON LOW-END EMULATORS AND DEVICES

(75) Inventor: Yaniv Vakrat, Ashdod (IL)

(73) Assignee: Sun Microsystems, Inc., Santa Clara, CA (US)

( * ) Notice: Subject to any disclaimer, the term of this patent is extended or adjusted under 35 U.S.C. 154(b) by 518 days.

(21) Appl. No.: 10/767,848

(22) Filed: Jan. 29, 2004

(51) Int. Cl.
*G06F 11/00* (2006.01)

(52) U.S. Cl. ........................................ 714/38
(58) Field of Classification Search ................. 714/38, 714/45, 46, 57
See application file for complete search history.

(56) References Cited

U.S. PATENT DOCUMENTS

| | | | |
|---|---|---|---|
| 5,922,079 A | 7/1999 | Booth et al. | |
| 6,002,868 A * | 12/1999 | Jenkins et al. | 717/105 |
| 6,026,437 A * | 2/2000 | Muschett et al. | 709/219 |
| 6,167,352 A | 12/2000 | Kanevsky et al. | |
| 6,378,088 B1 | 4/2002 | Mongan | |
| 6,385,741 B1 | 5/2002 | Nakamura | |
| 6,449,731 B1 | 9/2002 | Frey, Jr. | |
| 6,560,721 B1 | 5/2003 | Boardman et al. | |
| 6,708,324 B1 * | 3/2004 | Solloway et al. | 717/124 |
| 6,839,647 B1 * | 1/2005 | Volkov et al. | 702/119 |
| 6,847,916 B1 | 1/2005 | Ying | |
| 2003/0236657 A1 * | 12/2003 | Ryzl | 703/23 |

* cited by examiner

*Primary Examiner*—Nadeem Iqbal
(74) *Attorney, Agent, or Firm*—Meyertons Hood Kivlin Kowert & Goetzel, P.C.; B. Noël Kivlin

(57) ABSTRACT

Testing of computing devices is automated by recording each of the tests once, capturing user interface operations as a record, and then rerunning the tests repetitively and automatically on the same or different instances of the target device, substantially without human intervention. A successful test is indicated by identity of corresponding screens captured from a reference device and the target device.

35 Claims, 4 Drawing Sheets

```
     .
     .
     .
     SCREEN1    AAAABBBAAABBB. . . AAAAA        ← 66
     EVENT1     ZXZXZX. . . ZXZX
68 → SCREEN2    AAAABBBAAABBB. . . BBBBB ← 70
     EVENT2     VWUVWU. . . ZXZX
     .
     .
     .
```

```
     .
     .
     .
     SCREEN1    AAAABBBAAABBB. . . AAAAA        ← 72
     EVENT1     ZXZXZX. . . ZXZX
74 → SCREEN2    AAAABBBAAABBB. . . DGDGD ← 76
     EVENT2     VWUVWU. . . ZXZX
     .
     .
     .
```

AUTOMATED VERIFICATION OF USER INTERFACE TESTS ON LOW-END EMULATORS AND DEVICES

BACKGROUND OF THE INVENTION

1. Field of the Invention

The present invention relates generally to hardware and software testing and verification, and specifically to testing software on low-end emulators and computing devices.

2. Description of the Related Art

The meanings of acronyms and certain terminology used herein are given in Table 1:

TABLE 1

| | |
|---|---|
| API | Application programming interface |
| CLDC | Connected, limited device configuration. CLDC is suitable for devices with 16/32-bit RISC/CISC microprocessors/controllers, having as little as 160 KB of total memory available. |
| HTTP | HyperText Transfer Protocol |
| IP | Internet Protocol |
| J2EE | Java 2 Enterprise Edition |
| J2ME | Java 2 Micro Edition |
| J2SE | Java 2 Standard Edition |
| JAD | Java application descriptor |
| JAR | Java archive |
| JDTS | Java Device Test Suite |
| MIDlet | A MIDP application |
| MIDP | Mobile information device profile. A set of Java APIs, which, together with the CLDC, provides a complete J2ME application runtime environment targeted at mobile information devices. |
| MIDP-RI | MIDP-Reference Implementation |
| UI | User Interface |
| WTK | Wireless Toolkit |

MIDP is defined in Mobile Information Device Profile (JSR-37), JCP Specification, Java 2 Platform, Micro Edition, 1.0a (Sun Microsystems Inc., Palo Alto, Calif., December 2000). MIDP builds on the Connected Limited Device Configuration (CLDC) of the Java 2 Platform, Micro Edition (J2ME) (available from Sun Microsystems Inc., Palo Alto, Calif.). The terms Sun, Sun Microsystems, Java, J2EE, J2ME, J2SE, and the Sun logo are trademarks or registered trademarks of Sun Microsystems, Inc. in the United States of America and other countries. All other company and product names may be trademarks of their respective companies. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Tools have been developed in recent years to aid in the design verification of hardware and software systems, for example software suites, hardware circuitry, and programmable logic designs. In order to assure that the design complies with its specifications, it is common to generate a large number of input or instruction sequences to assure that the design operates as intended under a wide variety of circumstances. In general, test systems produce a report indicating whether tests have been passed or failed, and, in some cases may even indicate a module that is estimated to be faulty.

Conventionally, in order to test a device under development (such as a mobile information device), or to test software designed to run on such a device, a developer connects the device to an appropriate test system. The target device under test may be connected to the test system either directly or via a communication emulator. The developer selects a battery of test programs to run on the target device while monitoring its behavior. Running the complete battery of tests can commonly take many hours or even days. This problem is particularly acute in testing low-end computing devices, such as cellular telephones and other mobile information devices, which have limited computing power and memory resources.

It is common to execute tests using a user interface (UI), which is typically a graphical user interface. This interface is used to control execution of the tests, and to verify that what appears on the device screen under certain circumstances is correct and consistent. Tests, which are interactively verified in this manner, are referred to herein as "UI tests". However, since the number of different tests need for a target device under development today can easily exceed 800 or more, running such tests using a conventional user interface is indeed an onerous undertaking. It has been found that the sheer number of results to be evaluated is likely to incur operator errors during the verification process. Furthermore, running such tests using a user interface can consume valuable time and can reduce the productivity of an engineering group. Thus, testing the target device can become a serious bottleneck in the development cycle.

SUMMARY OF THE INVENTION

The invention provides a level of automation for interactive tests similar to what exists today for non-interactive tests. A complete test cycle involving both non-interactive and interactive tests can be completed with minimal input from an operator or test engineer.

In accordance with embodiments of the present invention one or more target devices are connected to a test server, either directly or via an emulator. Whenever a device completes a test or a bundle of tests, it reports the results to the server and requests the next bundle of tests to execute. Based on the report, the server selects the next bundle of tests to assign to that device.

In order to improve testing efficiency, the testing process is automated according to embodiments of the present invention by recording each of the tests once, capturing the user interface operations as a record, and then rerunning the tests repetitively and automatically on the same or different instances of the target device, substantially without human intervention.

The invention provides a method for testing computing devices, which is carried out in a first phase of operation by downloading a test program a first time from a server for execution by a first computing device coupled thereto, executing the test program on the first computing device to produce program events, recording the program events, and capturing first screens of the first computing device that are displayed responsively to the program events while the test program is executing on the first computing device. The method is carried out in a second phase of operation by downloading the test program a second time for execution by a second computing device, replaying the test program on the second computing device to reproduce the program events, capturing second screens of the second computing device that are displayed while executing the test program on the second computing device responsively to the reproduced program events, and comparing at least one of the first screens to a corresponding one of the second screens.

According to one aspect of the method, the second phase of operation is performed automatically and substantially without human intervention.

According to another aspect of the method, the second phase of operation includes automatically injecting the program events into an event handler.

According to an additional aspect of the method, the program events are injected into the event handler as executable code.

According to one aspect of the method, the program events are injected into the event handler as a stream of event code for processing by the event handler.

In another aspect of the method, the steps of replaying, capturing second screens and comparing are performed automatically and substantially without human intervention.

According to a further aspect of the method, the program events comprise a time interval between a current event and another event.

According to yet another aspect of the method, the program events comprise program actions.

According to still another aspect of the method, the program events comprise user actions.

An additional aspect of the method downloading the test program a first time and downloading the test program a second time are performed by downloading a JAR file and a JAD file.

According to one aspect of the method, the second computing device includes a plurality of second computing devices, and the second phase of operation is performed concurrently on the plurality of second computing devices.

According to another aspect of the method, the second computing device and the test program are MIDP compliant.

The invention provides a computer software product, including a computer-readable medium in which computer program instructions are stored, which instructions, when read by a computer, cause the computer to perform a method for testing computing devices, which is carried out in a first phase of operation by downloading a test program a first time from a server for execution by a first computing device coupled thereto, executing the test program on the first computing device to produce program events, recording the program events, and capturing first screens of the first computing device that are displayed responsively to the program events while the test program is executing on the first computing device. The method is carried out in a second phase of operation by downloading the test program a second time for execution by a second computing device, replaying the test program on the second computing device to reproduce the program events, capturing second screens of the second computing device that are displayed while executing the test program on the second computing device responsively to the reproduced program events, and comparing at least one of the first screens to a corresponding one of the second screens.

The invention provides a system for testing computing devices coupled to a server having a test framework executing therein that is adapted for interaction with the computing devices, wherein in a first phase of operation a test program is executed by a first computing device coupled thereto to produce program events. The server is adapted to record the program events, and to capture first screens of the first computing device that are displayed responsively to the program events. In a second phase of operation, the test program is executed by a second computing device coupled to the server under control thereof to reproduce the program events. The server is adapted to capture second screens of the second computing device that are displayed responsively to the reproduced program events, and to compare at least one of the first screens to a corresponding one of the second screens.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system, This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

Current embodiments of the invention have been adapted to particular platforms, in particular MIDP-RI 2.0 and J2ME Wireless Toolkit 2.0 Beta 2 or higher, both available from Sun Microsystems, Inc. However, the invention is not limited to these platforms, and the teachings herein may be readily adapted, using ordinary skill in the art, to many other platforms by implementing automation-related API's or their equivalents.

System Architecture.

Figure 1:
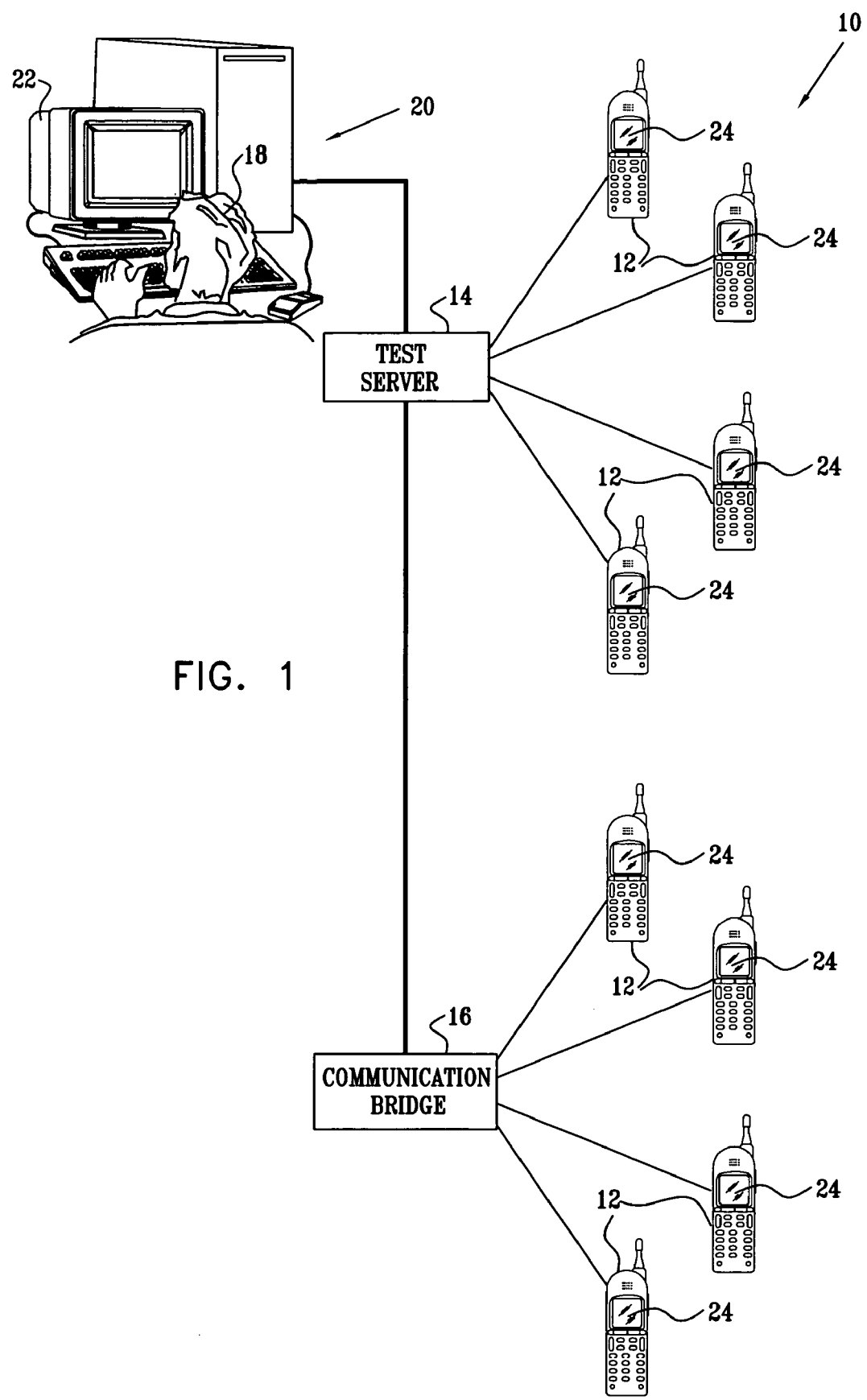
FIG. 1 is a block diagram that schematically illustrates a system for automatically testing one or more target devices, in accordance with an embodiment of the present invention.

Reference is now made to FIG. 1, which is a block diagram that schematically illustrates a system 10 for automatically testing one or more target devices 12, in accordance with an embodiment of the present invention. The system 10 is built around a test server 14, which is described in greater detail hereinbelow. The target devices 12 are typically low-end devices, with limited computing power and memory, for example, cellular telephones or personal digital assistants (PDA's). In the description that follows, the target devices 12 are assumed to comply with MIDP, but the principles of the present invention are equally applicable to other types of low-end computing devices, operating in accordance with other standards and specifications. The test server 14 typically comprises a programmable processor, and has suitable communication interfaces, such as wireless or wired interfaces, for communicating with the target devices 12 simultaneously.

Optionally, the test server 14 communicates with at least some of the target devices 12 through a communications bridge 16. The communications bridge 16 links the test server 14 and the target devices 12, and, for example could emulate a radio interface of the target devices 12. The communications bridge 16 is typically used for devices that are rigidly programmed so that they cannot directly communicate with the test server 14. For example, the devices may all be provided with the same IP address. Multiple communications bridges of this sort may be connected to the test server 14 in parallel, but only one is shown in FIG. 1 for the sake of simplicity. The communications bridge 16 has multiple ports, for connecting to multiple target devices 12 for concurrent operations therewith. On the side of the test server 14, however, the communications bridge 16 typically has only a single IP address. Therefore, in this embodiment, the IP address cannot be used conveniently to identify the individual target devices 12, and an alternative ID is typically used, as disclosed in described in commonly assigned Application No. (STC File No. 47979), entitled Parallel Text Execution on Low-End Emulators and Devices, which is herein incorporated by reference.

A user 18 of the system 10, such as a test engineer, interacts with the software elements of the test server 14, during certain phases of operation, as described in further detail hereinbelow. The user 18 operates a workstation 20 and interacts with the test server 14 via a user interface that is presented on a display 22 or a display 24 of the target devices 12.

In configurations of the system 10 in which more than one target device is being tested simultaneously, each of the target devices 12 receives a unique identifier (ID) for communicating with the test server 14. Typically, the identifier may comprise a unique Internet Protocol (IP) address that is assigned to each of the target devices 12 for communicating with the test server 14. Alternatively, the test server 14 may assign identifiers of other types, or the identifiers may be pre-stored in the target devices 12. Suitable methods for assigning and using these identifiers are described in the abovenoted Application No. (STC File No. 47979).

Figure 2:
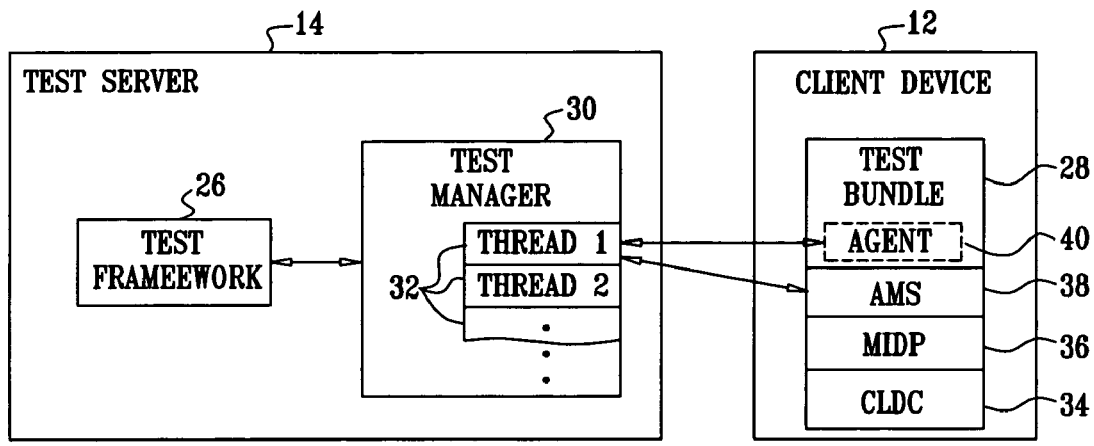
FIG. 2 is a block diagram that schematically illustrates software program components running on a test server and target devices in accordance with a disclosed embodiment of the present invention.

Reference is now made to FIG. 2, which is a block diagram that schematically illustrates software program components running on the test server 14 and the target devices 12 (FIG. 1), in accordance with a disclosed embodiment of the present invention. Elements of this software may be provided to the test server 14 and the target devices 12 on tangible media, such as optical or magnetic storage media or semiconductor memory chips. Alternatively, the software may be downloaded to the test server 14 and/or to the target devices 12 in electronic form, over a network or over the air, for example.

The test server 14 includes a test framework 26, which generates and deploys the tests to be carried out by the target devices 12. The tests typically are packaged in the form of Java applications contained in a set of JAD and JAR files. Each JAR file of this sort, together with its accompanying JAD file, is referred to hereinbelow as a test bundle 28. A suitable test framework for this purpose is described, for example, in commonly assigned Application No. (STC File No 47900), entitled, Automated Test Execution Framework with Central Management, which is herein incorporated by reference. The user 18 (FIG. 1) initially selects the tests to be executed. Alternatively, other test frameworks may be used for generating required test files, as will be apparent to those skilled in the art.

A test manager 30 in the test server 14 is responsible for distributing the tests among target devices 12, based on the unique client identifiers mentioned above. Typically, whenever one of target devices 12 requests a new test bundle, the test manager 30 reads the request and assigns a new thread 32 to handle it. This thread 32 is then responsible for the particular request. In general, a different thread 32 is created for each request involving processing and communication with the target devices 12. For example, a request for a new test bundle, for a new test within a current test bundle, or a request for results are all implemented by the creation of a different thread 32. After assigning the thread 32, the main thread of the test manager 30 waits for the next client request. This arrangement, together with the unique client identifier, ensures that the test server 14 will be able to handle multiple target devices 12 simultaneously without confusion.

In order to run Java applications, the target devices 12 are MIDP compliant and each contain an implementation of the Connected Limited Device Configuration specification, CLDC 34, with an implementation of the Mobile Information Device Profile specification, MIDP 36 running over CLDC 34. The applications that run on this technology, such as the tests supplied by the test framework 26, are known as MIDlets. These applications are created by extending an API MIDlet class of MIDP 36. Thus, each test bundle 28 is actually a MIDlet, packaged in the form of a JAD/JAR file pair.

The test bundle 28 is typically downloaded to the target devices 12 in a two-step process:

1. The test server 14 downloads the JAD file, which contains environment settings and some environment demands. Application Manager Software, referenced as AMS 38, which is typically a part of a browser built into the target devices 12, evaluates the JAD file to ensure that the device is able to accept the MIDlet. For example, the JAD file for a given MIDlet may specify that the device must support MIDP version 2.0 or higher. Otherwise, the device would reject the application download, and would thus save the time that would be consumed by downloading the much larger JAR file.

2. After completing all the relevant checks, the AMS 38 reads from the JAD file the location of the corresponding JAR file on the test server 14 and asks to download the JAR file to one or more of the target devices 12. The JAR file contains all the relevant classes of the test bundle 28.

Once the JAR file for a given test bundle is downloaded to one of the target devices 12 and stored in the local device memory, the device is ready to run the tests in the bundle. Every JAR file that the AMS 38 downloads to the target devices 12 typically contains an agent 40, which is used to run the tests, in addition to the classes corresponding to the tests themselves. To start test execution the AMS 38 runs the agent class. The agent 40 then addresses the test server 14 in order to receive instructions regarding the next test to run (getNextTest) and to report test results (sendTestResult), typically using a protocol based on HTTP. Each test in the test bundle 28 may correspond to a respective class in the JAR file. Alternatively, a class may include several tests, which invoke multiple test cases within the class. Each client request that is addressed by the agent 40 to the test server 14 includes the unique ID that has been assigned to the particular one of the target devices 12, so that the test server 14 is able to recognize the client and serve it in the correct manner.

Implementation.

In one embodiment, the test framework 26 (FIG. 2) has been implemented as a modification of the test framework, "Java Device Test Suite" (JDTS) (version 1.0 or higher), available from Sun Microsystems, Inc., which employs MIDP. A Java interface is constructed to artificially inject events into the MIDP event handler of the target devices 12 or the communications bridge 16. This interface enhances the Java Device Test Suite by providing a programmatic capability to control the user interface as if it were being done interactively via the keyboard or mouse.

Artificial events may be injected into the native event code, and could be pushed onto the event stream from which MIDP reads its events. Alternatively, artificial events may be injected directly into Java code within the Java event handler of MIDP. The latter approach has several advantages over the former. Events include user actions, such as mouse clicks or selection, keyboard operation, and various program actions, e.g., I/O operations, program exceptions, time-outs, and initiation and completion of operations.

The Java event handler of MIDP is instantiated at runtime via a system property setting, as shown in Listing 1. For example, by modifying the configuration property com.sun-.lcdui.eventHandler, a MIDP build can be modified as to which event handler is used at runtime. This may be done without any special compilation options being set, and without recompilation of the event handler for test automation purposes. Furthermore, the code used to inject events artificially is separated from the remainder of the MIDP bundle by encapsulation in a separate subclass of the default event handler. Accordingly, the native code remains unchanged across all MIDP platforms and ports. The modified Java event handler is usable in all MIDP implementations, which use the base Java event handler functionality. Advantageously, the user interface automation functionality can be cleanly removed, not only from the binary version of the software, but also from its source code, simply by removing the separate event handler subclass and its related interfaces. Other techniques known to the art for implementing the event handler may also be employed.

The programmatic interface for generating events is only part of the modification of the Java Device Test Suite disclosed herein. If merely an interface to generate events were provided in the Java Device Test Suite, the UI tests would have to be manually converted into Java test files, and the event sequence in each UI test encoded in the source code as calls to the event generation interface. Furthermore, time intervals between events would also need to be encoded. Preparing such Java programs would be time consuming, would require trained programmers, and would involve extensive debugging.

A "record" feature is provided in the modified event handler. Using this feature, the operator is involved only to the extent of running the interactive UI tests one time in a recording mode, while a reference test device is linked to a server running the Java Device Test Suite. During this onetime run, test event sequences, time intervals between events, and captured screens are recorded. In some embodiments, the time intervals between successive events may be recorded. Alternatively, each event may be time-stamped, and the inter-event time intervals computed subsequently. In any case, all recorded information is stored in separate files, independently of the corresponding UI tests. Subsequently, when connected to a device-under-test having the same specification as the device used for recording the information, the Java Device Test Suite restores the saved event sequence, and passes it to the modified event handler for automatic replay, substantially without human intervention. A screen capture taken during the replay, which represents the response of the device-under-test, should match that taken at the end of the manually run interactive UI test using the reference test device. Furthermore, all the intermediate screens that are generated by the device-under-test in response to stimulation by the Java Device Test Suite should match corresponding intermediate screens that were captured when the test was initially recorded by the operator.

ScreenGrabber.

Event generation API's of the modified event handler are dependent upon the "screen grabber" functionality that is already present in MIDP (ver. 1.0.3 or higher). In order to facilitate understanding of the invention, the screen grabber functionality is explained briefly. The public class ScreenGrabber is a class that returns a hash of the pixels on the MIDP display drawing region. The principal method of the class ScreenGrabber is a method getData, which returns a digest of the "pixelmap" of the current MIDP display area. Currently, the pixelmap is defined as the drawing area, as well as the status bar at the top of the screen and the area of the screen devoted to scroll arrows and softkey menu labels.

A method getInstance returns a reference to an instance of the class ScreenGrabber.

Event Sequence.

A class EventSequence encapsulates the semantics of a single MIDP event, representing a sequence of events and a screen capture taken at the end of those events.

A first class constructor EventSequence recreates a stored event sequence and its associated screen capture resulting from the input stream.

A second class constructor EventSequence creates a new EventSequence object based on a set of other EventSequence objects. This produces a composite EventSequence object, which is treated as a sequence by an AutomatedHandler interface (described hereinbelow) during testing. That is, each subsequence and its associated capture screen capture are replayed. If any subsequence fails, the value false is returned. If all of the subsequences pass, the value true is returned. The class EventSequence has the following methods.

A method appendSequence appends an EventSequence object to another EventSequence object, and thereby creates a composite event sequence.

A method toByteArray writes an EventSequence object and its corresponding screen capture to a designated output stream. The EventSequence object is represented as an array of bytes, which can be passed to the class constructor to recreate the event sequence.

Automation Handler.

An abstract automation handler interface provides an automation handler class, which includes options to record and playback a sequence of events for automation purposes, and to capture screen contents. It has the following methods.

A method capturescreen captures the current contents of the physical display in the form of a byte array. The byte array may be a reduced form of the display, such as a checksum or hash, but it is guaranteed to be unique for the display, such that no two differing displays can have the same return value.

A method registerHotKey establishes a specific key code for the given action to serve as a "hotkey".

A method registerSequenceHandler establishes a sequence handler to handle the completion of event sequences and screen captures that occur as a result of a hotkey press. Once a sequence handler is established, that sequence handler is called whenever an event sequence is completed through invocation of a method stopEventSequence, which is disclosed hereinbelow. The sequence handler may also be invoked as a result of a hotkey being pressed, which the event handler recognizes as a signal to stop event recording. An EventSequence object passed to the sequence handler is the same as the return result of the stopEventSequence method. If a sequence handler has been set, and the method registerSequenceHandler is invoked again, the existing sequence handler is discarded and the new sequence handler used. If the value null is passed to the method registerSequenceHandler, any previous sequence handler is discarded.

A method replayEventSequence replays a given event sequence, which is represented in an EventSequence object. It captures the contents of the screen that is displayed at the end of the event sequence, and compares it to a captured screen that is included in the EventSequence object.

A method startEventSequence initiates recording of an event sequence. Any event sequence currently being recorded is destroyed and a new event sequence started.

A method stopEventSequence stops recording of an event sequence, and captures the current contents of the screen. It then returns an EventSequence object, which is the representation of the entire event sequence as well as the screen capture resulting at the end of the sequence. If no events occurred during the capture, the event sequence is simply a timed delay and a screen capture. The timed delay is the interval between the call to the method startEventSequence and the method stopEventSequence. If the method stopEventSequence is called without previously calling the method startEventSequence, an EventSequence object is returned, which is essentially empty, and only contains the current contents of the captured screen.

A method updateScreenForSequence updates the screen capture for a given event sequence. Over time, the screen captures in a stored event sequence may become outdated. This method executes the event sequence, captures the resulting screen, and returns the EventSequence object, which now includes the updated screen information.

Operation.

Figure 3:
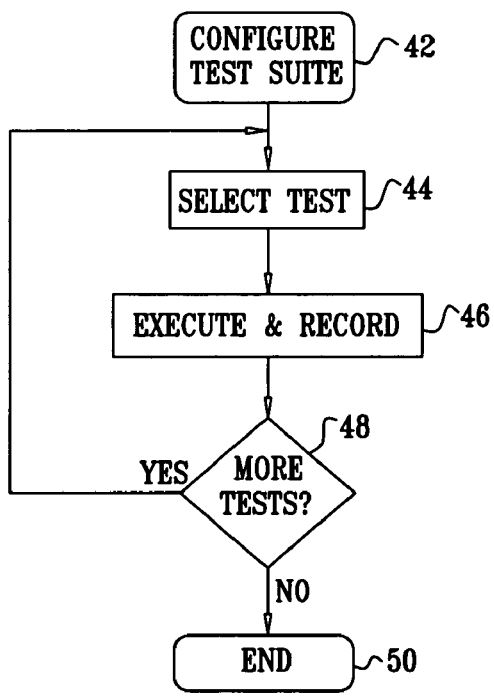
FIG. 3 is a flow chart illustrating a recording phase of a method of automated verification of user interface tests in accordance with a disclosed embodiment of the invention.

Reference is now made to FIG. 3, which is a flow chart illustrating a method of automated verification of user interface tests in accordance with a disclosed embodiment of the invention. For clarity, the method is described with reference to the system 10 (FIG. 1) and a modification of the Java Device Test Suite. However, the method disclosed with reference to FIG. 3 is by no means limited to use with the system 10, and may be practiced with other test frameworks and system architectures.

At initial step 42 a suite of tests is configured conventionally. It is assumed that the tests are to be run using a user interface, and that interactions between the user 18 and the target devices 12 are conducted using the display 22 (FIG. 1). The details of preparing, loading, and selecting tests are outside the scope of the invention, and are therefore not discussed. However, it is assumed that the tests have been debugged and verified, and are in condition for use in evaluating target devices. It should be noted that certain types of tests are not currently suitable for automatic verification, for example, tests involving such controls as tickers and dates. The test framework 26 is configured. Exemplary configuration details for the Java Device Test Suite (ver. 1.0) are given in Appendix 1. It is recommended to define a recording session when using the test framework 26.

Next, at step 44, a first phase of operation is begun, in which a test is selected from the suite of tests configured in initial step 42.

Control now passes to step 46, where the test selected in step 44 is executed in manual recording mode. In current embodiments of the system 10 (FIG. 1), a test description window is loaded on the server side, which describes the test along with a control panel. The control panel buttons allow the user 18 to control test execution flow. The control buttons are labeled "Start Record", "Capture Screen", "Stop", "Passed" and "Failed". The user 18 is required to verify that the test running on the system 10 is indeed performing according to specifications. As the tests were all previously verified in initial step 42, it is expected that they will also pass in step 46. The actions of the control buttons are briefly described.

By clicking on a "start record" button, the recording process is begun. From this point forward in time, every action taken by the user 18 on the actual device, which may be shown on the display 24, is recorded and saved, for example, scrolling or clicking on a command control.

During the recording process the user typically performs certain actions that change the appearance of the current test's screen, e.g., insertion of characters into a textbox, or selection of an item displayed on a list box. These actions and responses of the reference target device are examples of events of the test program. Screens resulting from the events are generally captured and saved. Later, when executing in an automation verification mode, the actions that the user 18 performed are replayed by an emulator, and screen images produced by the user and the emulator are compared.

Upon completion of the test a button labeled "Passed" is used by the user 18 to certify that the test was performed correctly. It is not necessary to expressly capture the final screen, as this occurs automatically. Furthermore, all recorded events and screens are collected and stored on the file system of the test server 14 for later use in automation mode.

The time interval between events occurring during the test is automatically recorded. It is possible for the user 18 to cause the test to pause, and the ongoing counting of inter-event time to cease. Resumption of the test, including inter-event time counting may be resumed at the command of the user 18. These operations are accomplished using a "Stop button", and a "Resume button", respectively.

In the event that the test was not performed satisfactorily, or if an error has occurred during the recording process, clicking on a "Failed button" at any point during the test cancels the procedure, and causes all information that has been accumulated up to that point to be disregarded.

Upon completion of step 46, control passes to decision step 48, where a determination is made if more tests in the suite of tests that was configured at initial step 42 remain to be executed and recorded. If the determination at decision step 48 is affirmative, then control returns to step 44. Otherwise, control proceeds to final step 50.

Figures 4, 5, 6:
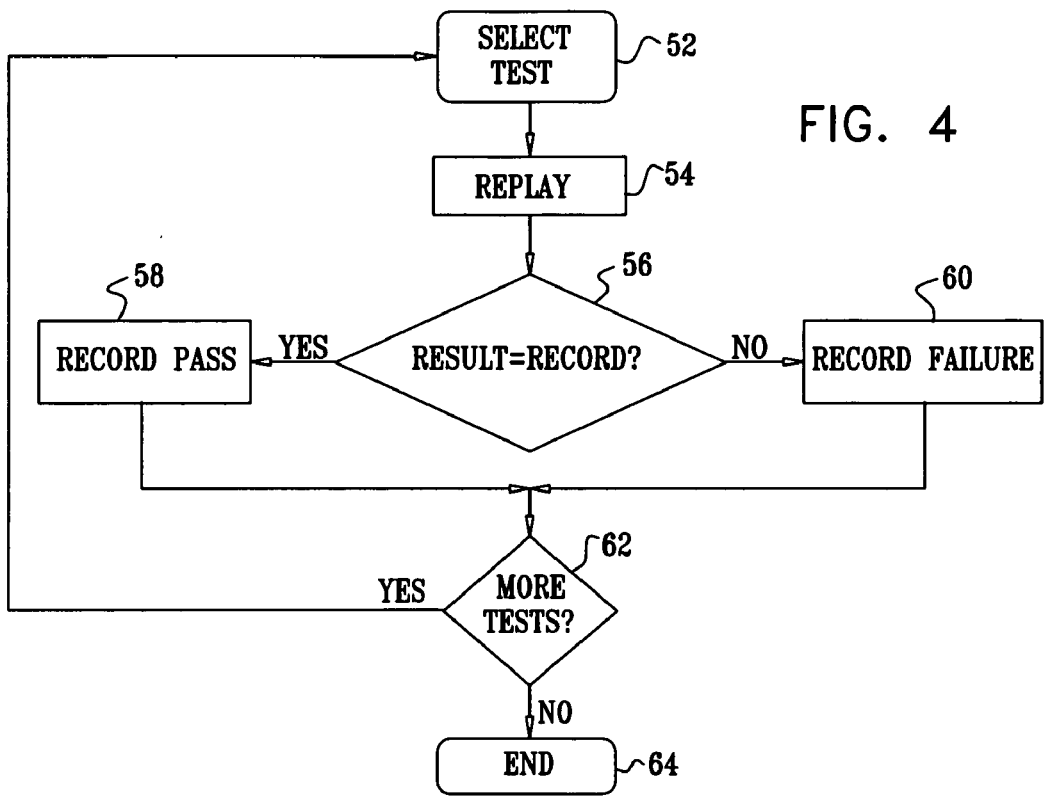
FIG. 4 is a flow chart illustrating a replay phase of a method of automated verification of user interface tests in accordance with a disclosed embodiment of the invention.
FIG. 5 is a fragmentary schematic illustration of a series of byte arrays representing a test record from an execution in recording mode in accordance with a disclosed embodiment of the invention.
FIG. 6 is a fragmentary schematic illustration of a series of byte arrays representing an updated test record from an execution in an updating mode in accordance with a disclosed embodiment of the invention.

Reference is now made to FIG. 4, which is a flow diagram illustrating a second phase of operation, in which the suite of tests that was configured at initial step 42 (FIG. 3) is replayed, this time automatically by the test server 14 (FIG. 1). The execution of the suite of tests is described with reference to one target device, but in practice a plurality of target devices 12 may be tested sequentially, or concurrently by the test server 14. At initial step 52, a test is selected from the suite of tests configured in initial step 42 (FIG. 3), and downloaded to one or more of the target devices 12. All or part of the sequence beginning with initial step 52 may be performed automatically and substantially without human intervention.

Control now passes to step 54, where the test that was selected in initial step 52 is now reexecuted. The test server supplies the event sequence that was recorded in step 46 to the target device. The event sequence is then replayed in the target device. Execution of the supplied event sequence causes the target device to mimic the actions initiated by the human operator in step 46 faithfully. During replay, when a screen is generated at the target device, or in an emulator, it is compared with the corresponding screen of the previously recorded event sequence. Thus, the replay process returns results associated with the same events as previously recorded in step 46. Each screen that was captured in step 46 is compared with a corresponding screen that that was captured in the replayed event sequence of step 54, and the results of the comparison memorized in a results log file. It should be noted that there is no need to re-record the complete test sequence in step 54. Only newly generated screens need to be evaluated.

Next, at decision step 56, it is determined whether the results obtained in step 54 match corresponding results obtained in step 46.

If the determination at decision step 56 is affirmative, then control proceeds to step 58, where it is recorded that the test that was replayed in step 54 passed.

If the determination at decision step 56 is negative, then control proceeds to step 60, where it is recorded that the test that was replayed in step 54 failed.

Following performance of either step 58 or step 60, control passes to decision step 62, where a determination is made if more tests in the suite of tests that was configured at initial step 42 remain to be replayed. If the determination at decision step 62 is affirmative, then control returns to initial step 52. Otherwise, control proceeds to final step 64, and the procedure ends.

Updating.

Upon completion of a test execution in recording mode (step 46, FIG. 3), arrays of bytes are created, each of which represents an element occurring in the flow of UI test execution. Every recorded event and every captured screen is represented as a byte array. While recording of UI tests should occur only when it is believed the implementation is stable, nevertheless, relatively small changes might still be necessary to perfect the UI implementation. Such changes would of course affect the automatic verification. In order to avoid re-recording the test, a facility for updating the record is provided.

Reference is now made to FIG. 5, which is a fragmentary schematic illustration of a series of byte arrays 66 representing a test record from an execution in recording mode as described with reference to FIG. 3 in accordance with a disclosed embodiment of the invention. The record shows two events, event1 and event2, interspersed between two screens, screen1, and screen2 68. All the events and screens are represented by byte sequences, shown arbitrarily in upper case letters. In particular, screen2 68 has a terminal sequence of bytes 70, which corresponds to an icon on the captured screen. Assume that it has been necessary to modify the icon.

Reference is now made to FIG. 6, which is a fragmentary schematic illustration of a series of byte arrays 72, which is identical to the byte arrays 66 (FIG. 5), except that the screen screen2 68 has been replaced by a screen screen2 74 in an updating mode of operation, and which was individually captured in the same manner as the screen screen2 68. The screen Screen2 74 has a terminal sequence of bytes 76, which differ from the bytes 70 (FIG. 5), in that they represent a different icon than that of the screen screen2 68. The byte arrays 72 may be used in replaying the test that they represent in the same manner as the byte arrays 66, using the procedure detailed above with respect to FIG. 3.

Figure 7:
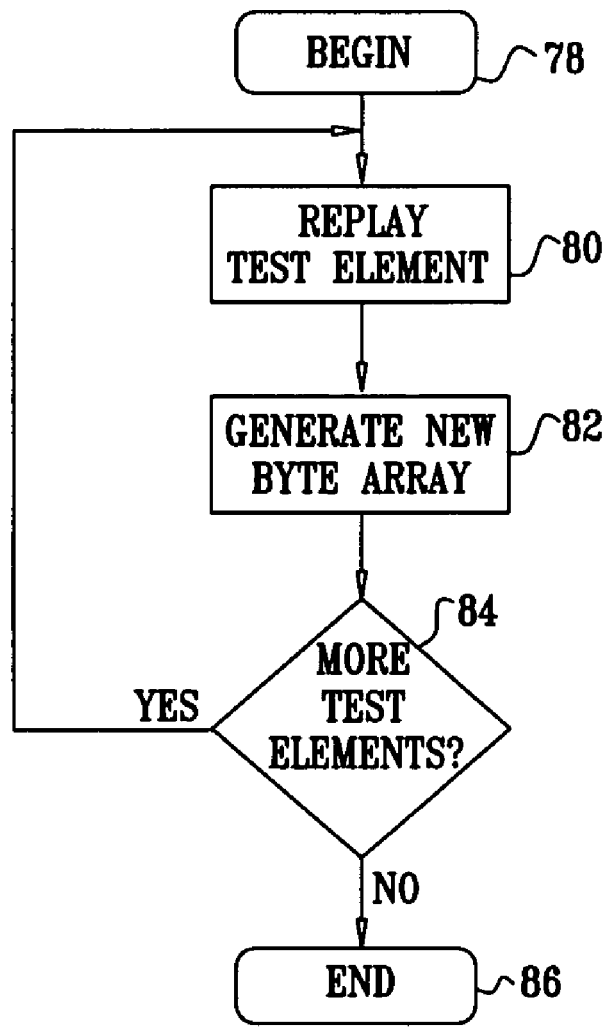
FIG. 7 is a flow chart illustrating a method of updating a test record in accordance with a disclosed embodiment of the invention.

Reference is now made to FIG. 7, which is a flow chart illustrating a method of updating a test record in accordance with a disclosed embodiment of the invention. The process begins at initial step 78 where a modification of an existing test is made. The modification is typically a change in a screen, but could be a variation in a user command sequence. The previously recorded record of the test is made available.

At step 80 an element of the test is performed. This may be a screen capture or a user command, such as a mouse click, text entry, or the like. It should be noted that there is no need for re-recording the test sequence during updating. The update process is totally automated. The test server supplies the event sequence that was recorded in step 46 (FIG. 3) to the target device, which then replays the events. As explained below, when the replay process reaches a screen needing to be updated, it replaces the pre-existing screen with a new screen, which is displayed as a consequence of replaying the events. The replay process returns a new event sequence with the same events but with new captures of the screens.

Next, at step 82, a new byte array is generated, representing a screen resulting from the element replayed in step 80.

Control now proceeds to decision step 84. A determination is made whether more elements of the test need to be executed. It is often not necessary to perform the entire test. Once it is recognized that all modified elements have been processed, and their respective byte arrays newly stored in the test record, the test may be discontinued.

If the determination at decision step 84 is affirmative, then control returns to step 80.

If the determination at decision step 84 is negative, then control proceeds to final step 86, and the procedure ends.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

Computer Program Listings

---
Listing 1
---
```
String n =
    Configuration.getProperty
        ("com.sun.lcdui.eventHandler");
if (n == null) {
    if (Configuration.getProperty
        ("microedition.configuration") != null) {
        n = "com.sun.midp.lcdui.DefaultEventHandler";
    } else {
        n = "com.sun.midp.lcdui.AWTEventHandler";
    }
}
Class c = Class.forName(n);
return (EventHandler) c.newInstance( );
```
---

Appendices

Appendix 1

MIDP Agent Configuration.

Open the internal.configuration file that is found under the lib directory. The value of the 'com.sun.midp.lcdui. eventHandler' attribute must be changed from "com.sun. midp.lcdui.DefaultEventHandler" to "com.sun.midp.lcdui. AutomationEventHandler".

The recommended situation of the edited file is
com.sun.midp.lcdui.eventHandler:
com.sun.midp.lcdui.DefaultEventHandler
com.sun.midp.lcdui.eventHandler:
com.sun.midp.lcdui.AutomationEventHandler

The invention claimed is:

1. A method for testing computing devices, comprising the steps of:
    in a first phase of operation:
        downloading a test program a first time from a server for execution by a first computing device coupled thereto;
        executing said test program on said first computing device to produce program events;
        recording said program events, and capturing first screens of said first computing device that are displayed responsively to said program events while executing said test program on said first computing device; and in a second phase of operation:
        downloading said test program a second time for execution by a second computing device;
        replaying said test program on said second computing device to reproduce said program events;
        capturing second screens of said second computing device that are displayed while executing said test program on said second computing device responsively to said reproduced program events; and
        comparing at least one of said first screens to a corresponding one of said second screens.

2. The method according to claim 1, wherein said second phase of operation is performed automatically and substantially without human intervention.

3. The method according to claim 2, wherein said second phase of operation comprises automatically injecting said program events into an event handler.

4. The method according to claim 3, wherein said program events are injected into said event handler as executable code.

5. The method according to claim 3, wherein said program events are injected into said event handler as a stream of event code for processing by said event handler.

6. The method according to claim 1, wherein said steps of replaying, capturing second screens and comparing are performed automatically and substantially without human intervention.

7. The method according to claim 1, wherein said program events comprise a time interval between a current event and another event.

8. The method according to claim 1, wherein said program events comprise program actions.

9. The method according to claim 1, wherein said program events comprise user actions.

10. The method according to claim 1, wherein said steps of downloading said test program a first time and downloading said test program a second time are performed by downloading a JAR file and a JAD file.

11. The method according to claim 1, wherein said second computing device comprises a plurality of second computing devices, and said second phase of operation is performed concurrently on said plurality of second computing devices.

12. The method according to claim 1, wherein said second computing device and said test program are MIDP compliant.

13. A computer software product, comprising a computer-readable medium in which computer program instructions are stored, which instructions, when read by a computer, cause the computer to perform a method for testing computing devices, comprising the steps of:
    in a first phase of operation:
        downloading a test program a first time from a server for execution by a first computing device coupled thereto;
        executing said test program on said first computing device to produce program events;
        recording said program events, and capturing first screens of said first computing device that are displayed responsively to said program events while executing said test program on said first computing device; and in a second phase of operation:
        downloading said test program a second time for execution by a second computing device;
        replaying said test program on said second computing device to reproduce said program events;
        capturing second screens of said second computing device that are displayed while executing said test program on said second computing device responsively to said reproduced program events; and
        comparing at least one of said first screens to a corresponding one of said second screens.

14. The computer software product according to claim 13, wherein said second phase of operation is performed automatically and substantially without human intervention.

15. The computer software product according to claim 14, wherein said second phase of operation comprises automatically injecting said program events into an event handler.

16. The computer software product according to claim 15, wherein said program events are injected into said event handler as executable code.

17. The computer software product according to claim 15, wherein said program events are injected into said event handler as a stream of event code for processing by said event handler.

18. The computer software product according to claim 13, wherein said program events comprise a time interval between a current event and another event.

19. The computer software product according to claim 13, wherein said program events comprise program actions.

20. The computer software product according to claim 13, wherein said program events comprise user actions.

21. The computer software product according to claim 13, wherein said steps of downloading said test program a first time and downloading said test program a second time are performed by downloading a JAR file and a JAD file.

22. The computer software product according to claim 13, wherein said second computing device comprises a plurality of second computing devices, and said second phase of operation is performed concurrently on said plurality of second computing devices.

23. The computer software product according to claim 13, wherein said second computing device and said test program are MIDP compliant.

24. A system for testing computing devices, comprising:
a server having a test framework executing therein that is adapted for interaction with a plurality of said computing devices that are coupled to said server;
wherein in a first phase of operation:
a test program is executed by a first computing device coupled thereto to produce program events;
said server being adapted to record said program events, and to capture first screens of said first computing device that are displayed responsively to said program events; and
wherein in a second phase of operation:
said test program is executed by a second computing device coupled to said server under control thereof to reproduce said program events, said server being adapted to capture second screens of said second computing device that are displayed responsively to said reproduced program events, and to compare at least one of said first screens to a corresponding one of said second screens.

25. The system according to claim 24, further comprising a workstation coupled to said server, wherein execution of said test program on said first computing device is conducted under control of said workstation.

26. The system according to claim 25, wherein said program events comprise user actions that are initiated on said workstation.

27. The system according to claim 24, wherein said second phase of operation is performed automatically and substantially without human intervention.

28. The system according to claim 27, wherein in said second phase of operation said server is adapted to handle said program events in an event handler and to automatically inject said program events into said event handler.

29. The system according to claim 28, wherein said program events are injected into said event handler as executable code.

30. The system according to claim 28, wherein said program events are injected into said event handler as a stream of event code for processing by said event handler.

31. The system according to claim 24, wherein said program events comprise a time interval between a current event and another event.

32. The system according to claim 24, wherein said program events comprise program actions.

33. The system according to claim 24, wherein said test program is downloaded to said first computing device and said second computing device as a JAR file and a JAD file.

34. The system according to claim 24, further comprising a communications bridge linked to said server, wherein said second computing device comprises a plurality of second computing devices that are linked to said server via said communications bridge, and said second phase of operation is performed concurrently on said plurality of second computing devices.

35. The system according to claim 24, wherein said second computing device and said test program are MIDP compliant.

* * * * *